(12) United States Patent
Collin

(10) Patent No.: US 10,668,509 B2
(45) Date of Patent: Jun. 2, 2020

(54) METHOD FOR PREPARING ORDERS LISTING UNIT LOADS

(71) Applicant: Savoye, Dijon (FR)

(72) Inventor: Jean-Michel Collin, Merceuil (FR)

(73) Assignee: SAVOYE, Dijon (FR)

(*) Notice: Subject to any disclaimer, the term of this patent is extended or adjusted under 35 U.S.C. 154(b) by 559 days.

(21) Appl. No.: 14/406,138

(22) PCT Filed: Jun. 5, 2013

(86) PCT No.: PCT/EP2013/061627
§ 371 (c)(1),
(2) Date: Dec. 5, 2014

(87) PCT Pub. No.: WO2013/182620
PCT Pub. Date: Dec. 12, 2013

(65) Prior Publication Data
US 2015/0134490 A1 May 14, 2015

(30) Foreign Application Priority Data

Jun. 6, 2012 (FR) ...................................... 1255259

(51) Int. Cl.
*B07C 5/38* (2006.01)
*G06Q 30/06* (2012.01)
*G06Q 10/08* (2012.01)

(52) U.S. Cl.
CPC ............... *B07C 5/38* (2013.01); *G06Q 10/08* (2013.01); *G06Q 10/087* (2013.01);
(Continued)

(58) Field of Classification Search
CPC ....................................................... B07C 5/38
See application file for complete search history.

(56) References Cited

U.S. PATENT DOCUMENTS 4,811,551 A    3/1989  Nambu
5,666,493 A *  9/1997  Wojcik ................. G06Q 10/087
                                                         705/22

(Continued)

FOREIGN PATENT DOCUMENTS

DE    19929985 A1     9/2000
EP    1647338 A1  *  4/2006  ............... B07C 5/38
(Continued)

OTHER PUBLICATIONS

International Search Report dated Aug. 19, 2013 for corresponding International Patent Application No. PCT/EP2013/061627, filed Jun. 5, 2013.

(Continued)

Primary Examiner — Thomas Randazzo
(74) Attorney, Agent, or Firm — David D. Brush; Westman, Champlin & Koehler, P.A.

(57) ABSTRACT

A method is provided for preparing instructions that each list unit loads. The method includes: obtaining unit loads; inputting the unit 11 loads into a sorting system under the supervision of a control system; sorting the unit loads using a sorting system in accordance with the instructions from and under the supervision of the control system; and, for each instruction, providing, via the sorting system, unit loads listed in the instruction. The step of obtaining unit loads is followed by forming logistical units, each including one or more unit loads, on the basis of the instructions from and under the supervision of the control system. The inputting, sorting, and providing steps are carried out by handling the logistical units obtained.

10 Claims, 4 Drawing Sheets

(52) U.S. Cl.
CPC ..... *G06Q 10/0875* (2013.01); *G06Q 30/0633* (2013.01); *G06Q 30/0635* (2013.01)

(56) References Cited

U.S. PATENT DOCUMENTS

| | | | | |
|---|---|---|---|---|
| 6,622,127 | B1* | 9/2003 | Klots | G06Q 10/06 705/28 |
| 6,769,228 | B1* | 8/2004 | Mahar | B65B 61/20 53/155 |
| 7,050,995 | B2* | 5/2006 | Wojcik | G06Q 10/087 705/14.1 |
| 7,663,072 | B2* | 2/2010 | Conard | B07C 3/00 209/584 |
| 7,668,727 | B2* | 2/2010 | Mitchell | G06Q 10/06315 705/330 |
| 7,765,120 | B2* | 7/2010 | Yadappanavar | G06Q 10/025 705/7.22 |
| 7,974,891 | B2* | 7/2011 | Shakes | G06Q 10/0875 705/28 |
| 8,156,013 | B2* | 4/2012 | Dearlove | G06Q 10/08 700/216 |
| 8,156,872 | B2* | 4/2012 | Hathaway | B61D 47/005 104/27 |
| 9,189,768 | B2* | 11/2015 | Plaster | G06Q 30/06 |
| 2004/0031732 | A1* | 2/2004 | Whitnable | B07C 5/00 209/584 |
| 2004/0122713 | A1* | 6/2004 | Hill, Sr. | G06Q 50/22 705/2 |
| 2005/0102203 | A1* | 5/2005 | Keong | G06Q 10/087 705/28 |
| 2012/0085686 | A1* | 4/2012 | Radema | B07C 5/3412 209/552 |

FOREIGN PATENT DOCUMENTS

| | | |
|---|---|---|
| EP | 1647338 A1 | 4/2006 |
| EP | 1754549 A2 | 2/2007 |

OTHER PUBLICATIONS

English translation of the Written Opinion dated Jun. 12, 2014 for corresponding International Patent Application No. PCT/EP2013/061627, filed Jun. 5, 2013.

* cited by examiner

METHOD FOR PREPARING ORDERS LISTING UNIT LOADS

1. CROSS-REFERENCE TO RELATED APPLICATIONS

This Application is a Section 371 National Stage Application of International Application No. PCT/EP2013/061627, filed Jun. 5, 2013, the content of which is incorporated herein by reference in its entirety, and published as WO 2013/182620 on Dec. 12, 2013, not in English.

2. FIELD OF THE INVENTION

The field of the invention is logistics and, in particular, the preparation of orders (also called customer orders).

More specifically, the invention concerns a method for preparing orders, especially but not exclusively when this method is implemented by an automated sorting and storage depot type storage system or, again, a cross-docking type system.

More generally, it can be applied in all cases where the methods for preparing orders are or can be used.

3. TECHNOLOGICAL BACKGROUND

There are known ways, especially for companies engaged in distance-selling and dispatching of products in small volumes, of implementing package-preparing systems. The term "package" is understood to mean an object or a set of goods comprising several objects, regardless of weight, dimensions and volume, constituting a unit load, because it is packed (in tubs, boxes, cases or crates, cardboard boxes, containers, overwraps, strapped or film-wrapped pallets, etc.).

The main examples of users of these automated or semi-automated systems for preparing orders are suppliers for large-scale distribution (fresh and dry goods for example), office equipment, clothing, cosmetics, tools and spare parts in the engineering sector. These systems enable preparation, with minimum labor force and within a set lead time, of a dispatch unit, corresponding to a precise order (also called a "customer order") from a customer, the order relating to several packages (otherwise called unit loads or goods) in different quantities, each of the packages with its quantity being identified by an order line.

These order-preparing systems generally implement a sorting system comprising for example an automated sorting and storage depot or a "cross-docking" type of order-preparing platform.

Cross-docking is an operation that makes it possible to consolidate the unit loads according to customer order from a sorting platform such as a sorting carousel. This technique makes it possible to prepare an order without in any way relying on a warehouse. It is therefore not necessary to store goods to carry out an order preparation or « picking» , of the unit loads ordered. The unit loads delivered, for example by supplier's vehicles, are deposited directly or indirectly on a sorting system to be sorted according to order. Unit loads can then be picked up one by one to be repacked.

One drawback of the cross-docking technique is that, despite its advantage in terms of reactivity and storage costs, it entails relative constraints in terms of logistics, i.e. with regard to the means needed for transporting and routing the flows of unit loads. Indeed, since the unit loads pass one by one, substantial conveyance means are needed, leading to relatively high costs.

Another drawback is that the floor space occupied by these different means implemented proves to be relatively great, and this is not satisfactory either.

Yet another drawback is that the time taken to prepare an order proves to be relatively great because of the lead time for taking each of the unit loads up to its destination (a repacking station for example) and hence because of the flow generated.

These drawbacks also exist for automated sorting and storage depot type sorting systems.

4. SUMMARY OF THE INVENTION

One particular embodiment of the invention proposes a method for preparing orders each listing unit loads, of the type comprising the following steps:
  obtaining unit loads;
  inputting the unit loads into a sorting system under the control of a management system;
  sorting the unit loads by means of the sorting system as a function of the orders and under the control of the management system;
  for each order, providing, via the sorting system, the unit loads listed in said order.

According to the invention, the step for obtaining unit loads is followed by a step for forming logistical units, each comprising one or more unit loads, as a function of the orders and under the control of the management system.

In addition, according to the invention, the steps for inputting, sorting and providing are performed by handling the logistical units obtained.

Thus the invention proposes a novel and inventive approach to the implementing of a method for preparing orders in which a plurality of unit loads (which may or may not be of the same nature) are grouped together in logistical units.

One advantage of such a method is that it reduces the time for preparing such an order because the unit loads arrive by "blocks" in logistical units, thus increasing the rate (the unit loads of a given order reach their destination more speedily than in the known solutions where the unit loads arrive one by one).

Another advantage is that the grouping of the unit loads into logistical units limits the amount of space taken up by the flow, and, therefore, the means that it needs have a footprint smaller than in the prior art.

Yet another advantage, flowing from the above advantage, is that such a method for preparing orders can be implemented with a less complex system that is less costly than in the prior art.

According to one embodiment of the invention, each order comprises order lines each indicating an unit load reference and a quantity of unit loads, and each logistical unit comprises the unit load or loads of an order line or of a portion of an order line.

Thus, this further limits the space and the time needed to prepare an order and also to enable a simple tracking of the order.

In different embodiments, each logistical unit can be handled by the sorting system in using an intermediate support or a means of temporary fixed joining or directly by the sorting system without any additional means.

This makes it possible thus to implement the method for preparing orders according to the invention in using the existing means of a sorting system and thus not causing additional costs.

Each logistical unit can also possess a composition belonging to the group comprising:
- compositions each comprising a single unit load;
- compositions each comprising at least two unit loads organized in at least one stack of least two unit loads and/or at least one layer of at least two unit loads.

Each logistical unit can also possess a composition determined as a function of at least one parameter belonging to the group comprising:
- the dimensions and/or the weight of the unit loads forming said logistical unit;
- a parameter of vertical and/or horizontal holding of the unit loads forming said logistical unit;
- the dimensions of an intermediate support or a means of temporary fixed joining used by the sorting system to handle said logistical unit;
- the maximum dimensions and/or the maximum weight of the elements being capable of being handled by the sorting systems.

In one particular embodiment, the step for forming logistical units is performed at least partly by a human operator, on the basis of information sent by the management system.

The step for forming logistical units can also be performed at least partly by a mechanical means, on the basis of instructions sent by the management system.

In one particular embodiment, the sorting system belongs to the group comprising:
- a cross-docking platform without storage;
- an automated sorting and storage system.

In one variant, the method comprises a step for repackaging the logistical units provided by the sorting system for each order.

5. LIST OF FIGURES

Other features and advantages of the invention shall appear from the following description given by way of a simple, indicative and non-exhaustive example and from the appended drawings, of which:

Figure 2:
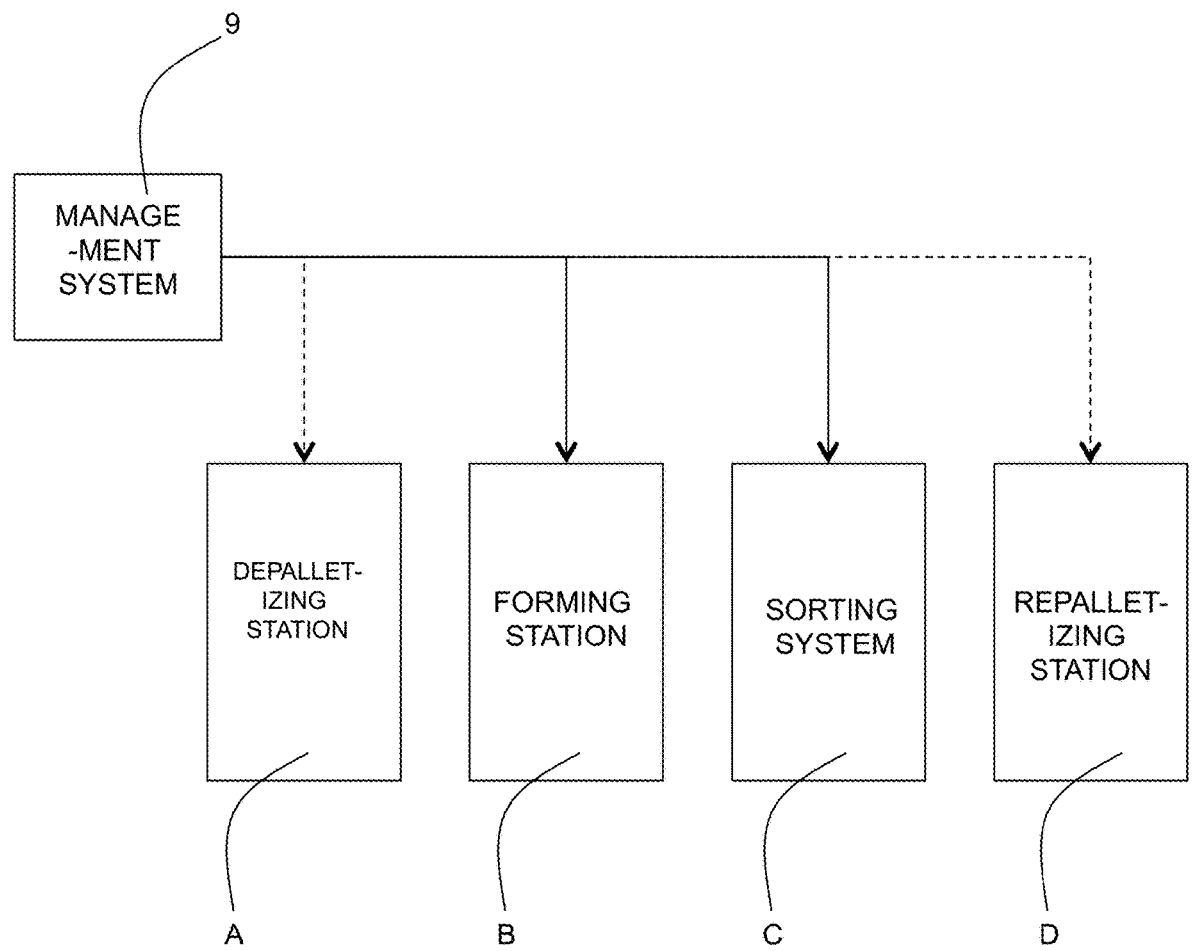
FIG. 2 is a schematic view of a system for preparing orders implementing the method for preparing orders of FIG. 1.
Figure 4:
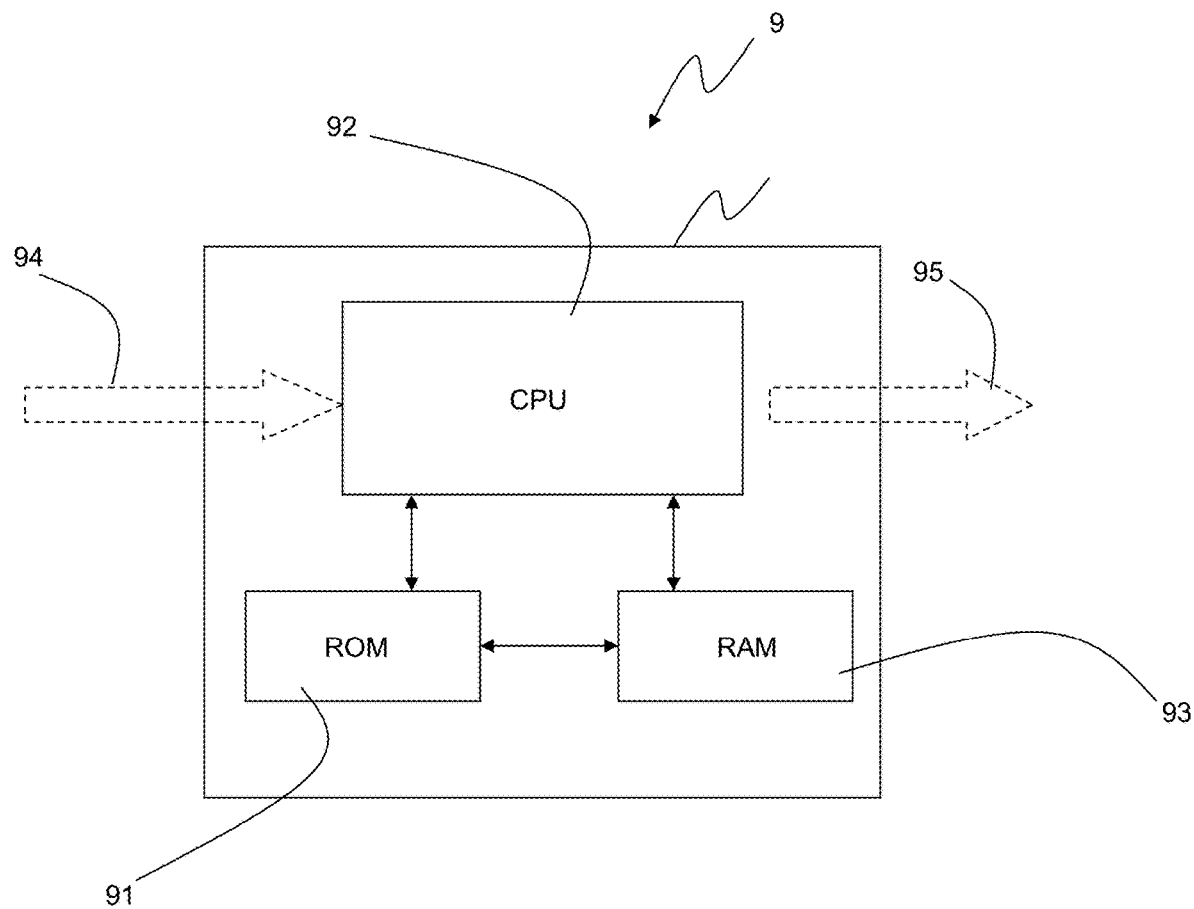

FIG. 4 presents an example of a simplified structure of the management system appearing in FIG. 2.

6. DETAILED DESCRIPTION

In all the figures of the present invention, the identical elements are designated by a same numerical reference.

Here below, referring to FIGS. 1 and 2, an embodiment is presented of the method for preparing orders according to the invention, along with a schematic view of a system for preparing orders implementing the method for preparing orders according to the embodiment of FIG. 1. The order comprises a plurality of order lines, each indicating a unit load reference as well as the quantity of unit loads desired for each reference.

Figure 1:
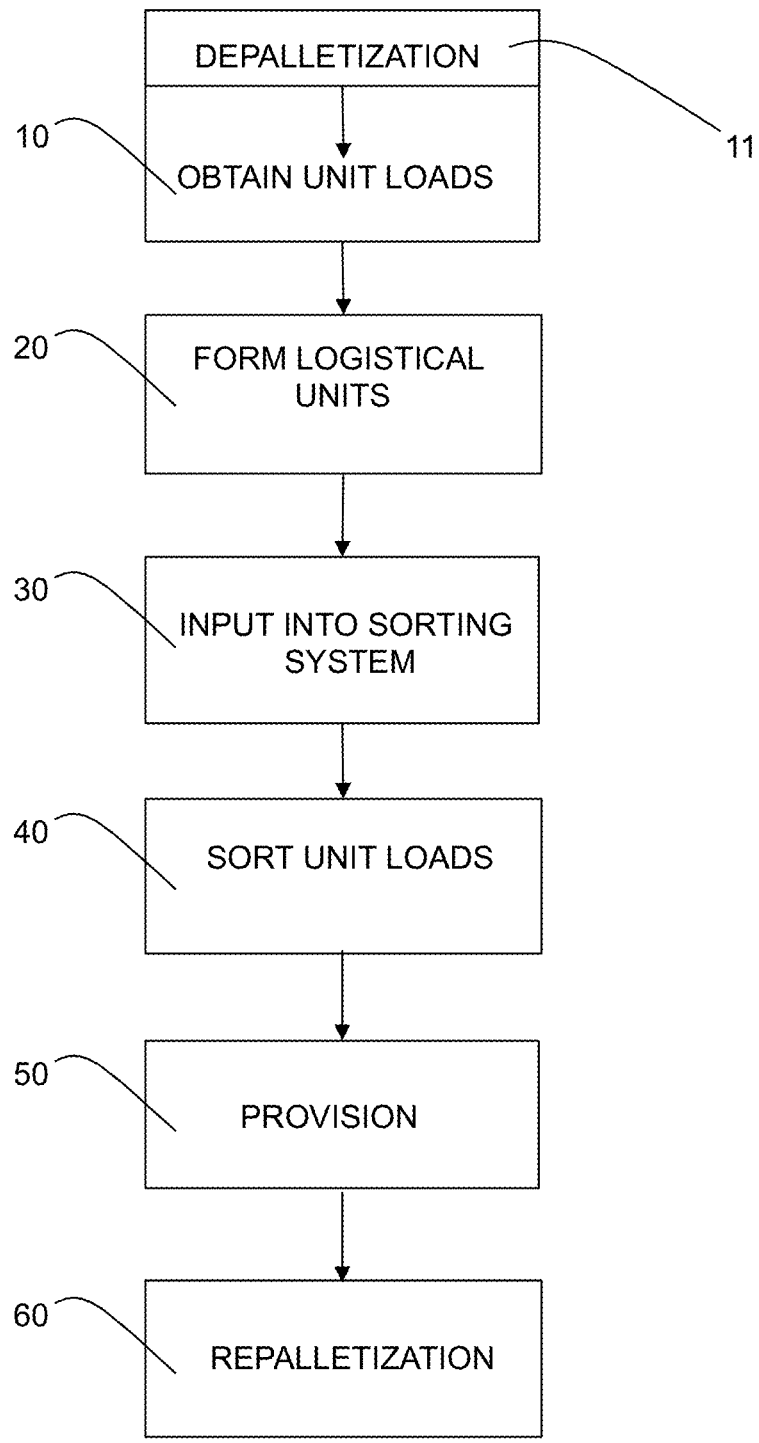
FIG. 1 is a flowchart representing the different steps of the method for preparing orders according to one particular embodiment of the invention.

As illustrated in FIG. 1, the method for preparing orders comprises first of all a step 10 for obtaining unit loads. This step for obtaining loads comprises a first sub-step 11 for depacking transportation units such as pallets or containers. In this embodiment, this step 11 for depacking is a step for depalletization from a station A for depalletizing, for example, pallets discharged from transporters, without mass storage. This depacking step 11 can be controlled by a management system 9.

Naturally, other embodiments can be planned, such as steps for obtaining that do not include the step 13 for depacking transportation units (for example in the case of an exit from a storage depot or a production line).

Following this step for obtaining unit loads, the method comprises a step 20 for forming logistical units at a station 8 for forming logistical units. A logistical unit is a composition comprising one or more unit loads of a same reference. A logistical unit is an entity that can be handled at the level of a sorting system C. The logistical units will be formed according to the their relevant customer order. In this embodiment, the logistical units each comprise the unit load or loads of an order line or a portion of an order line. In the same way, the desired quantity of a reference unit load (or a portion of the desired quantity, especially when the desired quantity is too great for only one unit load to be capable of containing it) is contained in a logistical unit, which makes it easy to track the order and also to optimise the flow and the preparation of the order in eliminating the lead time for routing the unit loads one by one.

Each logistical unit can therefore adopt different compositions according to the order line or the portion of order line that it relates to, and therefore the quantity of unit loads that will form this logistical unit:
- a composition comprising a single unit load;
- a composition comprising at least two unit loads organised in at least one stack of at least two unit loads and/or at least one layer of at least two unit loads.

Figure 3:
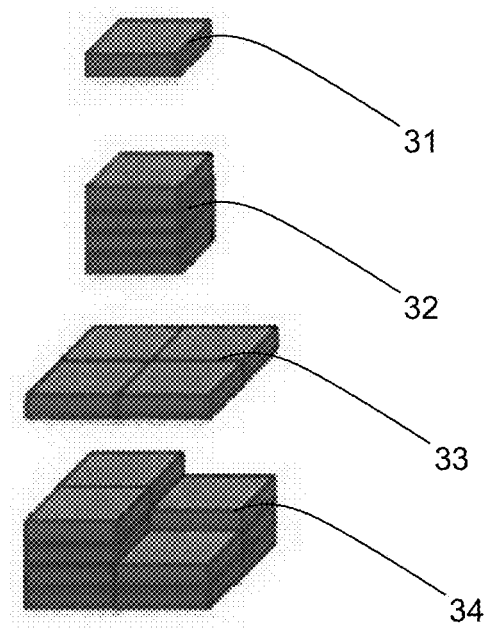
FIG. 3 is a table of different possible compositions of logistical units.

FIG. 3 illustrates four possible compositions of logistical units. The logistical unit referenced 31 is made up of a single unit load. A logistical unit referenced 32 is made up of four unit loads laid out in a stack. Two other compositions 33, 34 are illustrated in this FIG. 4. These compositions comprise one or more layers of unit loads. The logistical unit referenced 33 is made up of a layer of four unit loads while the logistical unit referenced 34 is made up of several layers constituted by stacks of juxtaposed unit loads.

The composition of each of the logistical units (each logistical unit of the customer order possibly having a different composition) will also depend, depending on the situation, on one or more parameters among the following:
- the dimensions and/or the weight of the unit loads that form the logistical units;
- a parameter of vertical and/or horizontal holding of the unit loads forming the logistical unit;
- the dimensions of an intermediate support or of a means for temporary fixed joining used by the sorting system C to handle the logistical unit;
- the maximum dimensions and/or the maximum weight of the elements that can be handled by the sorting system C.

The step 20 for forming these logistical units can be performed manually or semi-automatically (or even entirely automatically). In other words, the step for forming logistical units can be done at least partly by a human operator or at least partly by mechanical means such as a robotic arm.

This step 20 for forming logistical units is controlled by a management system 9 that sends information to a human operator or to mechanical means on the configuration to be adopted or instructions to form the logistical unit.

FIG. 4 presents the simplified structure of a management system 9 according to one particular embodiment of the invention. This management system comprises a RAM 93, a central processing unit (CPU) 92 equipped for example with a processor and driven by a computer program stored in a ROM 91. At initialization, code instructions of the computer program are for example loaded into the RAM 93 and then executed by the processor of the central processing unit 92 to implement the dispatch of information on the composition of the logistical units. The central processing unit 92 inputs one or more instructions 94 (information on the order line, parameters on the unit loads or the logistical units, the dimensions of an intermediate support or a temporary fixed joining means used by the sorting system to handle said logistical unit, the maximum dimensions and/or the maximum weight of the elements that can be handled by the sorting system). The processor of the processing unit 92 processes the instruction or instructions 94 and outputs information 95 enabling the operator or the mechanical means to form a logistical unit.

This FIG. 4 illustrates only one particular way, among several possible ways, of carrying out the technique of the invention in any one of its embodiments. Indeed, the management system can be set up equally well:

- on a reprogrammable computing machine (a PC computer, a DSP processor or a microcontroller) executing a program comprising a sequence of instructions, or
- on a dedicated computation machine (for example a set of logic gates such as an FPGA or an ASIC or any other hardware module).

Should the management system be set up on a reprogrammable computation machine, the corresponding program, i.e. the sequence of instructions can be stored in a storage machine (for example a memory card, a CD ROM or a DVD ROM) which may be detachable or non-detachable, this storage medium being partially or totally readable by a computer or a processor.

As illustrated in FIGS. 1 and 2, the unit loads combined in logistical units then reach the sorting system C during a step 30. This step 30 for the inputting of unit loads into the sorting system C is also carried out under the control of the management system 9. In a classic way, this sorting system C, according to different embodiments, is a cross-docking platform, or an automated sorting and storage system.

Then comes a step 40 for sorting unit loads by means of the sorting system C, depending on the orders and under the control of the management system 9. This sorting system C handles the logistical units directly or indirectly depending on the embodiments. In other words, the sorting system C, according to the first embodiment, handles each of the logistical units formed by means of an intermediate support (such as a tray) or a fixed joining means (such as a clamp). According to a second embodiment, each logistical unit is handled directly by the sorting system C without any additional means coming into play.

The sorting system C then, during a supply step 50, provides the unit loads listed in the order list in the form of logistical units in order to finalize the preparation of the order.

In this embodiment, the method furthermore comprises a step 60 for repacking logistical units provided by the sorting system C. This repacking takes the form of a repalletization at a repalletizing station D. This repacking step can be controlled also by the management system 9.

Naturally, other embodiments can be envisaged in which the step of repacking 60 is done in other ways, for example by placing in cardboard boxes or containers. It is also possible to imagine an embodiment that does not comprise any step of repacking.

An exemplary embodiment provides an order-preparing method that optimizes logistical flows in order to reduce the complexity of an order-preparing system implementing this method.

An exemplary embodiment provides an order-preparing method of this kind that reduces the time taken to prepare an order.

An exemplary embodiment provides an order-preparing method of this kind that optimizes the footprint of an order-preparing system implementing such a method.

An exemplary embodiment provides a method of this kind that is simple to implement and costs little.

Although the present disclosure has been described with reference to one or more examples, workers skilled in the art will recognize that changes may be made in form and detail without departing from the scope of the disclosure and/or the appended claims.

The invention claimed is:

1. A method comprising:
preparing a plurality of orders which list unit loads, each order comprising order lines, each order line indicating a unit load reference and a quantity of unit load(s) desired for said unit load reference, wherein the orders are prepared according to the following acts using a sorting system:
obtaining the unit loads for the plurality of orders;
forming logistical units for the plurality of orders by grouping the unit loads as a function of the order lines of each order and under control of a management system, the unit loads listed in a given order being grouped into several logistical units each comprising the quantity of unit load(s) indicated in a respective order line of said given order or in a portion of said respective order line, at least one of said logistical units comprising a plurality of the unit loads, wherein each logistical unit is an entity that has dimensions and a weight and that can be handled by said sorting system; and
using the sorting system to handle the logistical units as follows:
the sorting system receives the logistical units for the plurality of orders under the control of the management system;
the sorting system sorts the logistical units as a function of the plurality of orders and under the control of the management system; and
for each order of the plurality of orders, the sorting system provides the sorted logistical units comprising the unit loads listed in said order.

2. The method according to claim 1, wherein each logistical unit is handled by the sorting system using an intermediate support or a temporary fixed joining.

3. The method according to claim 1, wherein each logistical unit is handled directly by the sorting system without any additional means.

4. The method according to claim 1, wherein at least one of said logistical units comprises at least two unit loads organized in at least one stack of at least two unit loads and/or at least one layer of at least two unit loads.

5. The method according to claim 1, wherein each logistical unit possesses a composition determined as a function of at least one parameter belonging to the group consisting of:
the dimensions and/or the weight of the unit loads forming said logistical unit;
a parameter of vertical and/or horizontal holding of the unit loads forming said logistical unit;

the dimensions of an intermediate support or a temporary fixed joining used by the sorting system to handle said logistical unit;

the maximum dimensions and/or the maximum weight of the elements being capable of being handled by the sorting systems.

6. The method according to claim 1, wherein forming logistical units is performed at least partly by a human operator, on the basis of information sent by the management system.

7. The method according to claim 1, wherein forming logistical units is performed at least partly by a mechanical device, on the basis of instructions sent by the management system.

8. The method according to claim 1, wherein the sorting system belongs to the group consisting of:

a cross-docking platform without storage;

an automated sorting and storage system.

9. The method according to claim 1, wherein obtaining the unit loads comprises depacking at least one transportation unit.

10. The method according to claim 1, wherein the method comprises repacking the logistical units provided by the sorting system for each order.

* * * * *